(12) United States Patent
Schafer et al.

(10) Patent No.: US 7,509,745 B2
(45) Date of Patent: Mar. 31, 2009

(54) NON-SLIP MEASURING TOOL AND METHOD OF MAKING

(75) Inventors: Randal D. Schafer, Burlington, WA (US); Margaret D. Schafer, legal representative, Burlington, WA (US); Margaret D. Schafer, Burlington, WA (US); Ansel Kelman, Vernon (CA); David A. Ray, La Conner, WA (US)

(73) Assignee: Rulersmith, Inc., Burlington, WA (US)

( * ) Notice: Subject to any disclaimer, the term of this patent is extended or adjusted under 35 U.S.C. 154(b) by 0 days.

(21) Appl. No.: 10/567,187

(22) PCT Filed: Jul. 30, 2004

(86) PCT No.: PCT/US2004/025047

§ 371 (c)(1),
(2), (4) Date: Nov. 16, 2006

(87) PCT Pub. No.: WO2005/017446

PCT Pub. Date: Feb. 24, 2005

(65) Prior Publication Data

US 2007/0175052 A1    Aug. 2, 2007

Related U.S. Application Data

(60) Provisional application No. 60/492,593, filed on Aug. 4, 2003.

(51) Int. Cl.
*B43L 13/20* (2006.01)
*G01B 3/14* (2006.01)

(52) U.S. Cl. .......................................... 33/1 B; 33/562
(58) Field of Classification Search ................. 33/1 B, 33/1 K, 562, 563, 483, 566, 484, 489, 493
See application file for complete search history.

(56) References Cited

U.S. PATENT DOCUMENTS

| | | | |
|---|---|---|---|
| 2,230,010 A | | 1/1941 | Owens |
| 3,992,080 A | * | 11/1976 | Rowland ..................... 359/533 |
| 4,015,051 A | | 3/1977 | Offermann et al. |
| 4,745,139 A | | 5/1988 | Haasl et al. |
| 6,839,971 B2 | * | 1/2005 | Schafer et al. ................ 33/1 B |
| 2003/0110653 A1 | | 6/2003 | Schafer |
| 2004/0049935 A1 | | 3/2004 | Tandy |

FOREIGN PATENT DOCUMENTS

JP            07205973 A  *  8/1995

\* cited by examiner

*Primary Examiner*—Christopher W Fulton
(74) *Attorney, Agent, or Firm*—Seed IP Law Group PLLC

(57) ABSTRACT

A tool (10) for measuring, marking, or cutting material, the tool formed of a rigid sheet of transparent material (11) having a plurality of lines formed thereon, and a transparent, non-removable, slip-resistant coating (17) applied to a working surface of the rigid sheet to resist slipping of the tool when applied to the material.

33 Claims, 10 Drawing Sheets

NON-SLIP MEASURING TOOL AND METHOD OF MAKING

BACKGROUND OF THE INVENTION

1. Field of the Invention

The present invention pertains to tools for use in measuring and marking material, and, more particularly, to a transparent ruler having a non-removable, slip-resistant working surface.

2. Description of the Related Art

Transparent rulers having grid lines formed thereon are known for use in measuring and marking material, such as fabric, paper, plastic, and the like. These rulers are also used to guide a tool, such as a razor, knife, or rotary cutter, in cutting the material to desired sizes and shapes.

One such ruler is that described in U.S. Pat. No. 4,779,346 for a transparent measuring device that includes a plurality of continuous two-color lines of contrasting colors. In use, these lines are visible against a background of multiple colors, thus facilitating the measuring and marking of material.

To ensure accuracy, it is necessary that the ruler be firmly held in place with respect to the workpiece. Most rulers have a smooth planar bottom surface that will lie flat on the workpiece to be marked or cut. This smooth surface has the disadvantage of allowing the ruler to easily slip over the surface of the workpiece. Thus, a certain amount of force must be applied to a device to hold it in place on the workpiece. This frequently occurs on workpieces formed of or covered with a cloth or fabric material. In quilting applications, where large rulers are used to measure and mark material and to guide cutting tools on large pieces of fabric, it frequently becomes necessary to use both hands to hold the ruler in order to prevent it from slipping on the fabric. This makes it difficult for one person to measure or cut the fabric. Many times an individual will use a foot or knee to assist the one hand in applying pressure to the ruler in order to free the use of the other hand. This method is awkward and is not always feasible, such as in the case of handicapped persons or where the work surface is higher than the waist.

The disadvantage of the ruler described in U.S. Pat. No. 4,779,346 is that the working surface that is placed against the material is subject to slipping on the material. One device that attempts to overcome inadvertent slipping of the ruler is described in U.S. Pat. No. 5,829,150 issued to McEligot on May 1, 1998. Here, a sheet thick enough to guide a rotary cutter along one side and having an adhesive side is removably positioned on a rigid template material. This effectively forms a mechanical stop on the measuring device. The disadvantage is that the adhesive material easily collects dirt, lint, hair, and other material that reduces the adhesiveness and interferes with the use of the ruler. It also does not provide a non-slip surface but rather it forms a raised edge that can itself slide when placed on top of fabric.

Another device that attempts to address this slippage problem is a non-slip cutting ruler disclosed in U.S. Pat. No. 5,471,749, which teaches using retractable pins that secure the ruler to the fabric. This is a complex and potentially injury-causing approach that has not met with much success in the marketplace.

A further approach is to clamp the tool to the material, which is the subject of U.S. Pat. No. 4,875,667 that describes an elongate bar having a clamp at one end to brace the other end of the bar on a support surface. The other end of the bar is pushed down on a ruler and the underlying fabric. Unfortunately, this device can break the ruler when the bar is pressed down too hard. In addition, the bar is cumbersome to use and expensive.

Other methods have been employed to reduce slipping, such as: die-cut dots made from rubber, sandpaper, and cork; handles with suction cups to attach to the top surface of the tool; handles with pins that protrude through the plastic and into the fabric; weights; clear fingernail polish with salt; and ink with grit therein. These methods create one problem while solving another, including not providing enough grip, or gripping too much and snagging the fabric, scratching the work surface, not being transparent, wearing out, leaving adhesive on the ruler or the fabric, or cracking, crazing, or otherwise damaging the tool.

BRIEF SUMMARY OF THE INVENTION

In accordance with the disclosed embodiments of the invention, a device for measuring and marking material is provided that includes a transparent, rigid substrate having opposing first and second planar sides, one of which comprises a working surface that bears against the material, a plurality of lines formed on at least one of the opposing first and second planar sides, and a transparent, non-removable coating applied to the working surface of the substrate, the coating configured to resist or prevent slipping of the substrate against the material when the working surface is placed against the material.

In accordance with another aspect of the invention, the coating is formed from a substance that is applied in liquid form to the working surface of the substrate. Ideally, the liquid is air-dried after application. However, the coating may be formed of liquid that is actively dried, such as UV cured.

In accordance with another embodiment of the invention, a transparent measuring device is provided that includes a sheet of transparent material having opposing surfaces; one or more multicolor lines applied to one of the opposing surfaces on the sheet, and a coating of non-slip material applied to a working surface of the sheet to prevent slipping of the sheet against material.

In accordance with another embodiment of the invention, a method of making a non-slip device for measuring and marking material is provided. The method includes providing a transparent sheet of rigid material having first and second opposing planar sides; forming a plurality of lines on one of the first and second opposing planar sides; and forming a coating over a working surface of the sheet to provide a non-slip bearing surface when placed on the material.

In accordance with another aspect of the present invention, the coating is applied only over the multicolor lines formed on the working surface of the sheet. Alternatively, the coating is mixed with the pigment used to create the grid lines, thus providing slip-resistant lines on the working surface of the device. In the case of multi-colored composite lines, ideally the last line applied to the working surface is formed with the non-slip substance.

As will be readily appreciated from the foregoing, the present invention avoids the disadvantages of prior methods and achieves a removable slip-resistant or non-slip surface that is easily applied. The device or ruler will adhere when pressure is applied, does not snag fabric or materials when manipulating the ruler, can be marked on for a visual aid on the underside of the ruler, resists rolling back from the edge, does not damage or alter the ruler, can be used with any flat ruler or template, and is inexpensive and easy to use.

BRIEF DESCRIPTION OF THE DRAWINGS

The foregoing features and advantages of the disclosed embodiments of the invention will be more readily appreciated as the same become better understood from the following detailed description when taken in conjunction with the accompanying drawings wherein.

DETAILED DESCRIPTION OF THE INVENTION

The disclosed embodiments of the invention will be described in conjunction with the transparent measuring devices previously disclosed by applicant in U.S. Pat. Nos. 4,779,346 and 5,819,422, which are incorporated in their entirety herein by reference. The description of these prior devices and related methods is set forth below, and such description includes the improvements of the present invention where applicable.

Figure 1:
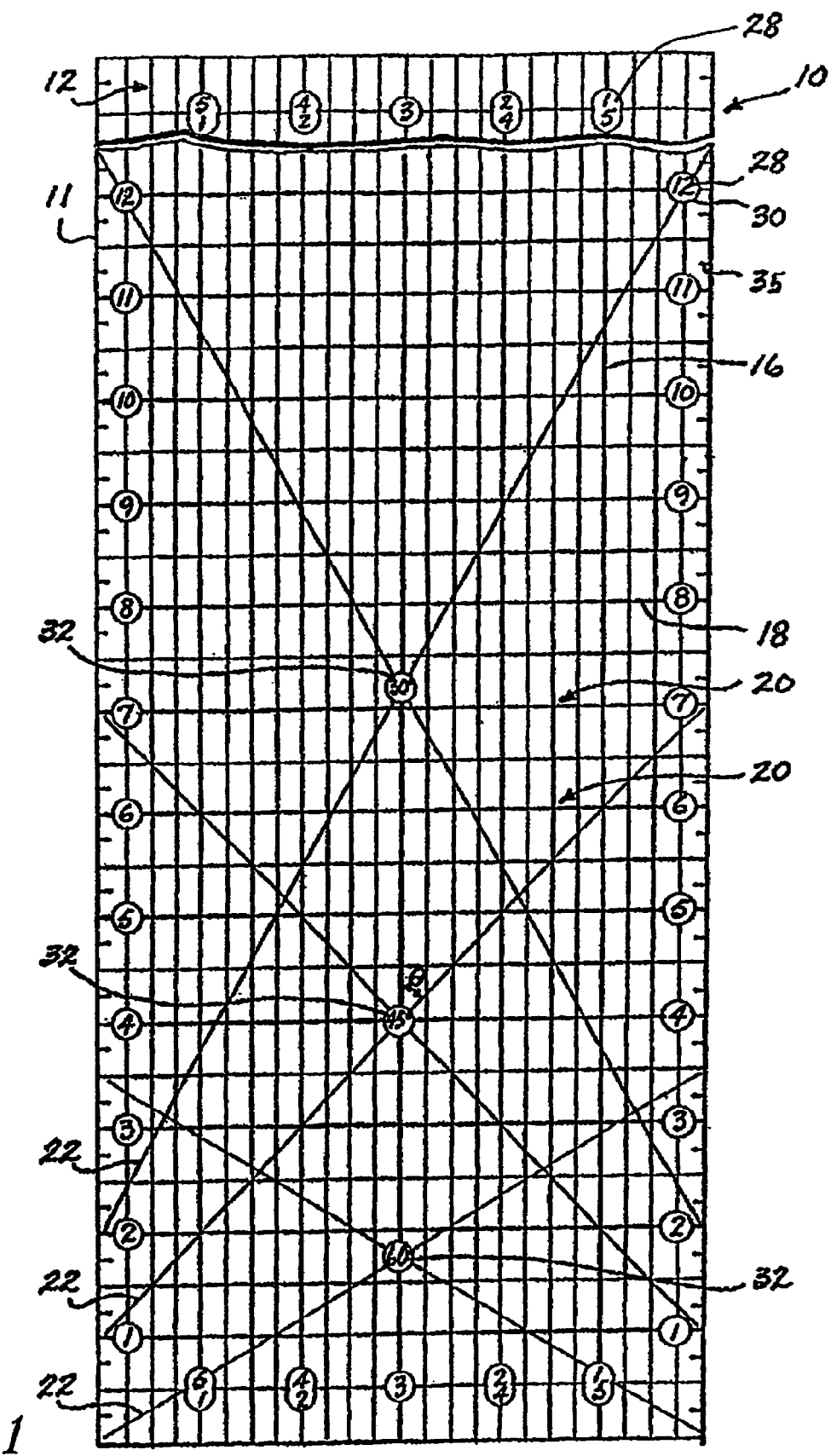
FIG. 1 is a plan view of a tool formed in accordance with one embodiment of the invention.
Figure 2:
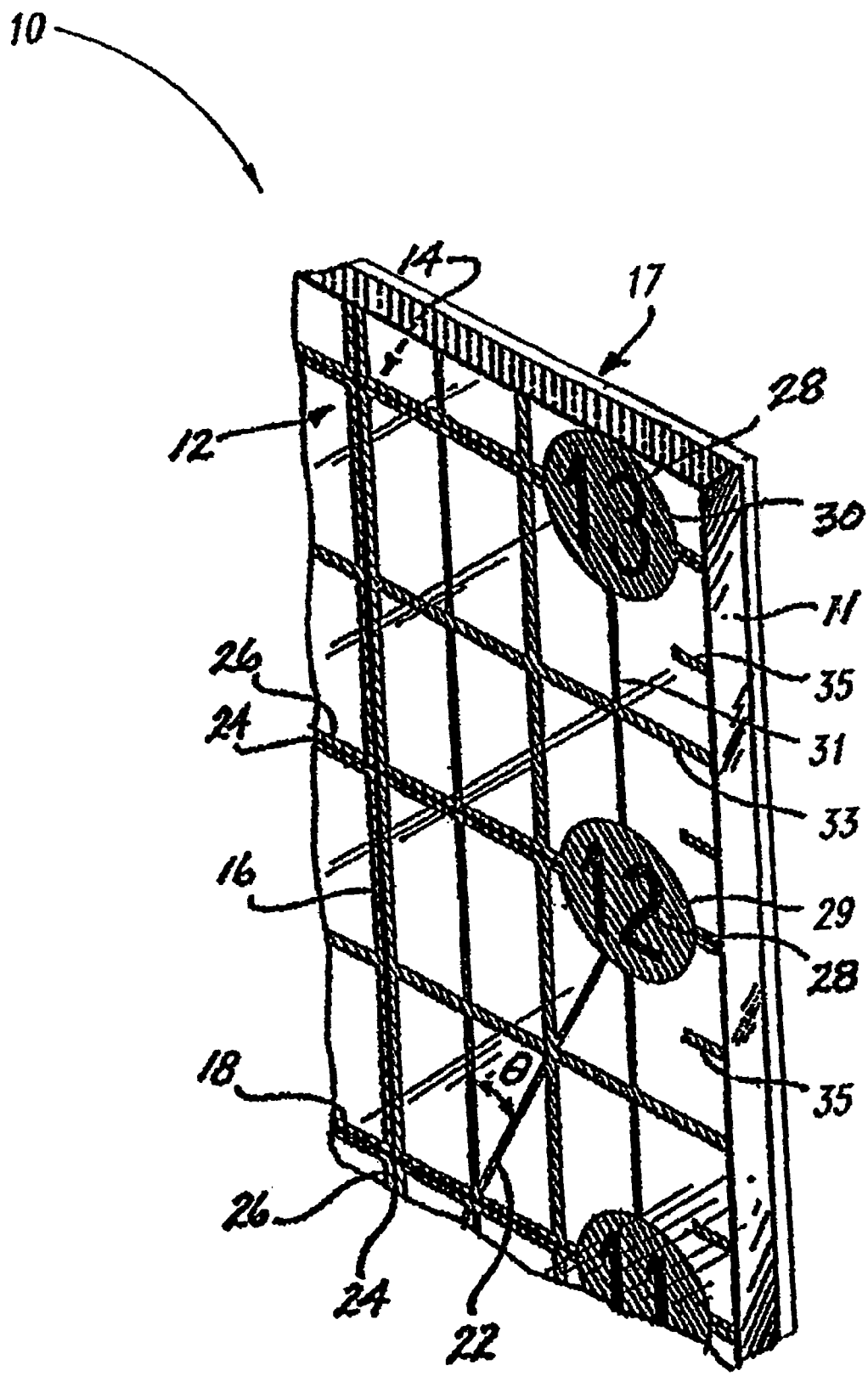
FIG. 2 is an enlarged isometric view of a portion of a tool formed in accordance with the teachings of the present invention.

FIGS. 1 and 2 illustrate two embodiments of a tool 10 formed in accordance with the present invention. Referring initially to FIG. 1, the measuring tool 10 includes a sheet 11 of transparent material having a planar front surface 12 and an opposing planar back surface 14. The sheet 11 may be formed from any suitable transparent material such as acrylic plastic. As shown in FIG. 1, the tool 10 is rectangular, having a preferred length of twenty-four (24) inches and a width of six (6) inches. However, it is to be understood that the tool 10 may be formed in other shapes and in different dimensions. A transparent sheet of flexible material 17 is adhered to the sheet 11, as will be described in more detail herein below.

A pattern of vertical and horizontal lines 16, 18 is formed on the front surface 12 of the rigid sheet 11, the pattern including the vertical lines 16 formed along the length of the sheet 11 and a plurality of horizontal lines 18 formed along the width of the sheet 11. The vertical lines 16 and the horizontal lines 18 are positioned substantially at right angles with respect to one another to thereby create a grid pattern of squares 20. In addition to the vertical lines 16 and the horizontal lines 18, there are angled lines 22 placed on the grid to form angles of 30°, 45°, or 60°, with either the vertical or horizontal lines. The angled lines 22 enable a user to orient the tool 10 at the angles indicated in the circles 32, so that the material can be measured, marked, or cut at an angle to a given line.

In the alternative embodiment shown in FIG. 2, selected vertical and horizontal lines 16, 18 are composite lines formed of a first line 24 and a second line 26. The first line 24 is of a first color (or hue) and the second line 26 is of a second color (or hue) that is different from the first color. Preferably, the first line 24 is superimposed upon the second line 26, and the first line 24 is of a lesser breadth than that of the second line 26, such that the second line 26 is visible on each side of the first line 24 when viewed from the front surface 12. However, the first line 24 and the second line 26 may also be placed in adjacent or partially overlapping relationship, so long as the two different colors are visible from the front surface 12. The first and second colors are of a contrasting nature, such as yellow and dark green, white and black, dark orange and light blue, black and yellow, or other combinations such that either one of the colors will be visible against backgrounds of various colors or against a multicolored background.

For purposes of illustration, FIG. 2 shows lines 24 and 26 formed on the front surface 12 of the measuring device 10. However, it will be understood that the lines could equally well be formed on the working surface, i.e. the back surface 14 of the rigid sheet 11, and that such back surface lines would have the advantage of reducing parallax errors. Combinations of front and back surface lines may also be used. The lines 24 and 26 may be formed by any suitable printing process, such as by a silk screen, lithograph press, or photographic process, by an engraving process such as laser engraving, or by combinations of the above techniques.

In the illustrated embodiments, selected horizontal and vertical lines 16, 18 are identified by consecutive numbers 28. The numbers 28, preferably of the first color, are formed to be positioned within an enlarged circle 30, preferably of the second color. As illustrated herein, the numbers 28 correspond to the distance of each line from an edge of the grid, preferably in inches, although other units may be used. In addition, the angled lines 22 have markings 32 representing the angle in degrees that each angled line 22 makes with the vertical lines 16 as measured at angles θ. Preferably, the squares 20 are further subdivided by vertical subdivision lines 31 and horizontal subdivision lines 33 placed between the vertical lines 16 and the horizontal lines 18. In addition, subdivision marks 35 are shown placed along the length of the measuring device 10 and on the edges thereof.

It is to be understood that the present invention can be used with any tool having one or more lines or graduations used for measuring or marking or cutting, or any combination of the foregoing, where a single color of line is used. Thus, the invention is not to be limited to tools having composite lines formed thereon.

In one embodiment of the invention, a transparent or nearly transparent, anti-slip, non-removable coating 17 is applied to the working surface or back surface 14 of the rigid sheet 11. This coating 17 covers the entire back surface 14 and preferably is applied after the lines 16, 18, and 22 are formed on the back surface 14. In this configuration, the coating protects the lines 16, 18, and 22, as well as other markings formed on the back surface 14, such as the numbers 28, and it provides a slip-resistant working surface.

In a preferred embodiment, the coating 17 is a substance having a high co-efficient of friction that resists slipping of the tool 10 on underlying material. In addition, the coating 17 should not attract or retain lint, dirt, dust and the like. Also, the coating should resist peeling and should not flake or leave any residue on the material.

Ideally, the coating is applied in liquid form and then hardened or permitted to harden. In one form, the coating is air dried, although in another form the coating is cured, such as with a UV curing process. The manner of hardening will depend on the nature of the coating material. For example, the material identified as "Through The Roof," manufactured by Sashco in Brighton, Colo., provides anti-slip qualities and requires only air drying to harden. Another material available from Tangent Industries in Winsted, Conn, is identified as X-506-26-1, and this material requires UV curing. Tangent Industries also sells a harder, less tacky substance identified as X-506-24-1.

The coating 17 may be applied with a roller, by spraying, screen printing, or other known method. When thus applied, the coating is hardened or allowed to harden. In use, the tool 10 is positioned with the coating 17 placed on the material. The user may need to apply a small amount of force to ensure the tool 10 remains in position while the material is measured, marked, or cut, or any combination of the foregoing.

Alternatively, the coating need only be applied over selected lines on the tool 10. This provides protection to the lines and an amount of resistance to slipping of the tool 10 on the material.

In another embodiment of the invention, the coating substance is mixed with the pigment used to print the vertical and horizontal lines 16,18. After the lines 16,18 are printed, they are allowed to dry or are actively dried to form slip-resistant lines. This avoids the step of coating the entire working surface of the tool 10 while still achieving the desired anti-slip properties. In this embodiment, the last layer of line to be printed is mixed with the coating substance and applied using a screen-printing process, described in more detail herein below.

With the composite lines, the black line is ideally printed first on the back surface 14, followed by the non-slip coating of a contrasting color or contrasting neon color, as desired. In certain embodiments, the composite lines have an optional third coat, preferably of white or white tint to enhance the "neon" or enhanced visibility effect of the tinted second line. In this case, the non-slip substance can be mixed with the optional third coat.

In the embodiment of the invention where the rigid sheet 11 is configured to have the composite two-color lines formed thereon, the method disclosed in U.S. Pat. No. 5,819,422 can be used to apply the composite lines to the front or back surfaces 12,14 of the rigid sheet 11. The description of this method is repeated below.

Figure 3:
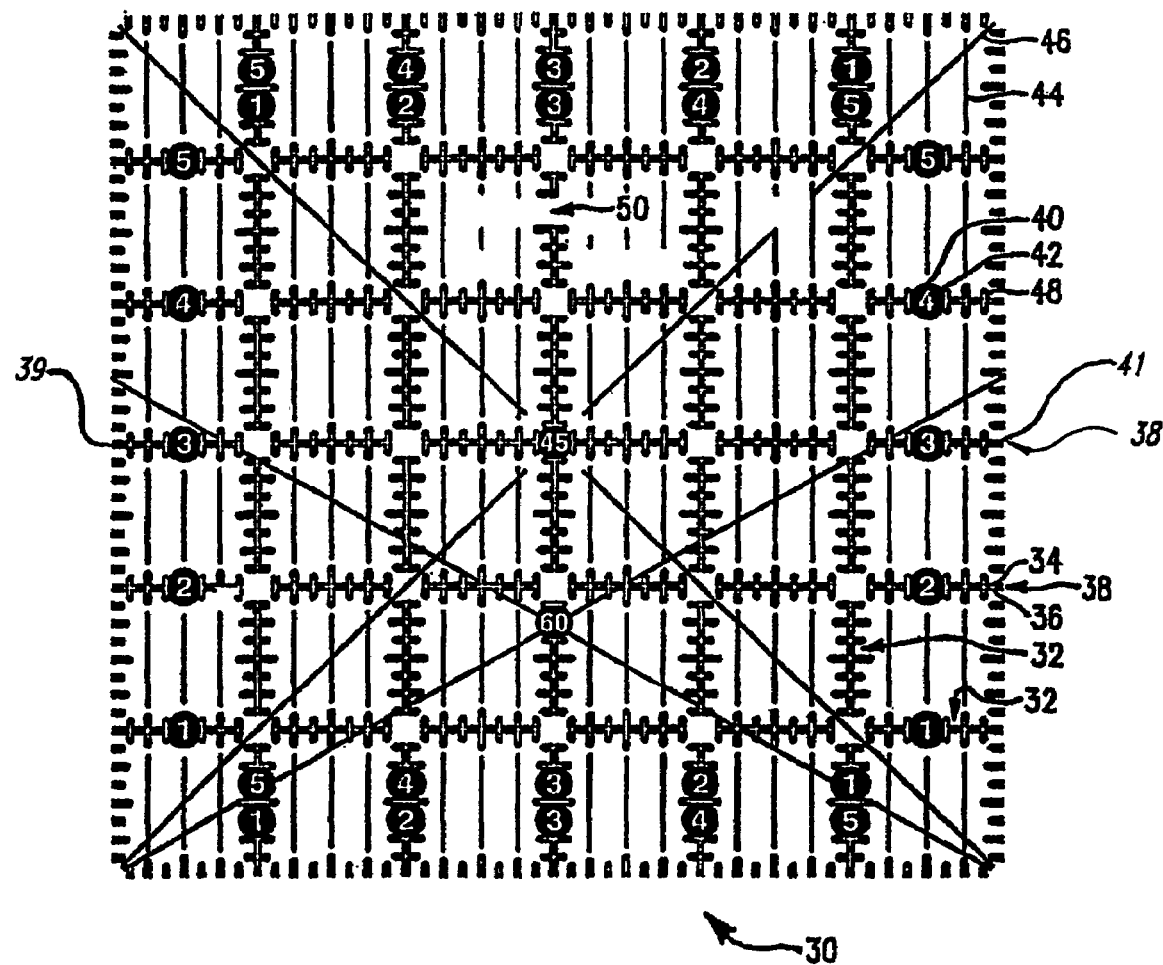
FIG. 3 is a top plan view of a first image to be applied to the sheet of transparent material in accordance with another embodiment of the present invention.

Referring to FIG. 3, shown therein is a first image 30 consisting of a pattern of horizontal and vertical graduations 32 with short subdivisions 48 extending therefrom at substantially right angles. Each graduation 32 and subdivision 48 is formed from a pair of lines 34 and 36 that outline an uncolored gap 38.

Ideally, the lines 34 and 36 have a width in the range of 1 one-thousandth of an inch to 20 one-thousandths of an inch, although the width could be greater depending on the application. The preferable width for quilting applications is in the range of 15 one-thousandths to 20 one-thousandths. The uncolored gap 38 is centered between the pair of lines 34 and 36, and has a preferred width of 2 one-thousandths of an inch, although again this could be smaller or larger, depending on the application and the capabilities of the image creation equipment. This provides the manufacturer and operator with greater tolerances within which to transfer the images and yet maintain precise alignment.

Preferably, the uncolored gaps 38 are bounded on substantially all sides by the pair of lines 34 and 36, and they are disposed centrally therein. The longitudinal ends 39 and 41 of the gaps 38 are not bounded, and there may be applications where there are segments that are unbounded along the length of the composite lines. There may also be applications where it is preferred that the gaps 38 not be centered between the pair of lines 34 and 36. Hence, variations are contemplated.

The first image 30 includes large darkened circles 40 that have uncolored number spaces 42 formed therein. In addition, the first image 30 includes solid vertical lines 44, and angled lines 46 that are of the same color as the graduations 32, although they do not form a part of the multicolor graduations 32. The large blank area 50 is used for the Omnigrid trademark, which is discussed more fully below.

Figure 4:
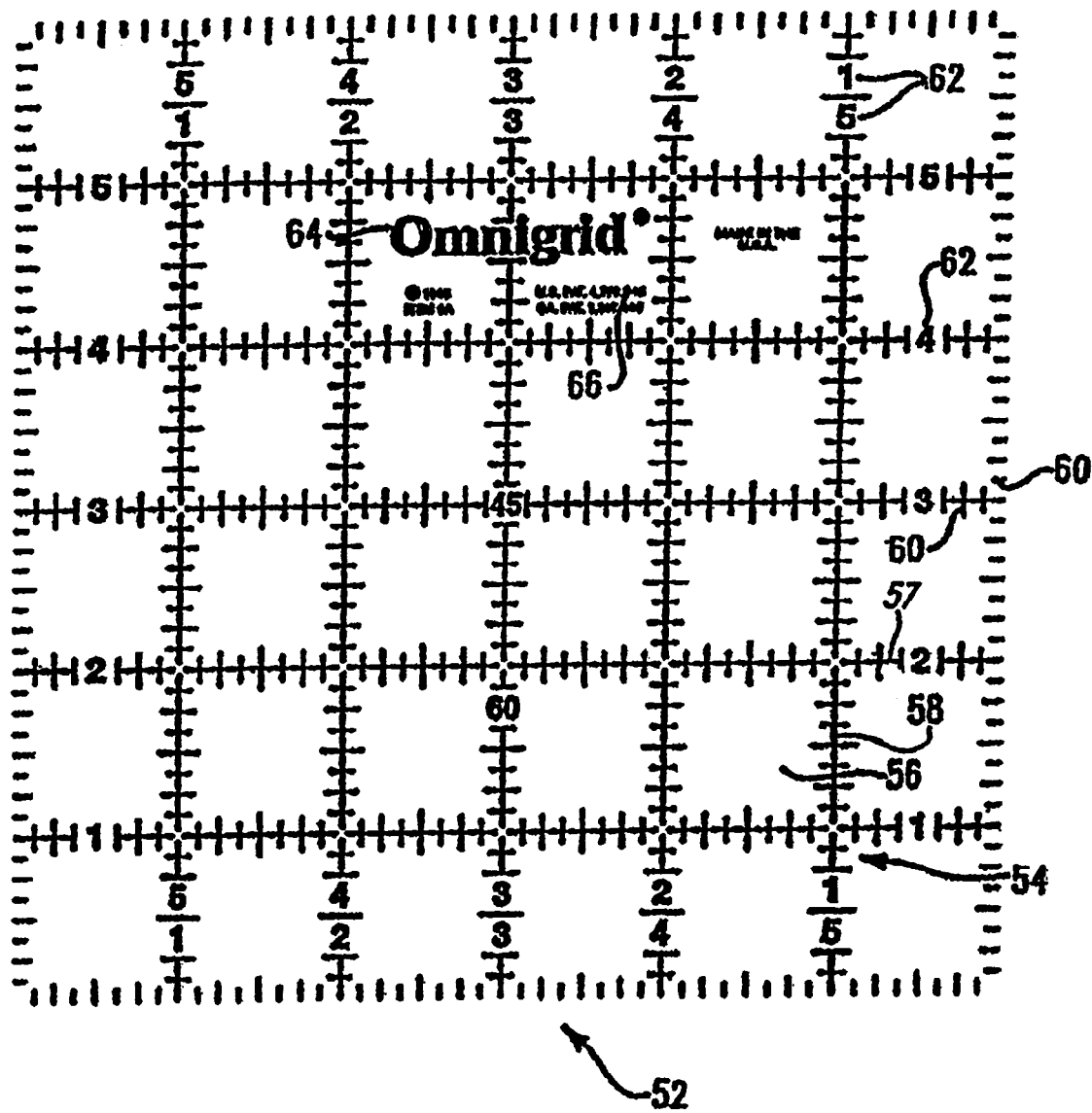
FIG. 4 is a top plan view of a second image to be applied to the sheet of transparent material.

In FIG. 4 is shown a second image 52 comprising solid horizontal lines 57 and vertical lines 58 forming a grid pattern 54 of squares 56. This second image 52, as well as the first image 30, is shown in the form it would appear on camera-ready film. Each of these lines 57 and 58 has subdivision lines 60 that further divide the lines 58 into smaller units of measurement. In addition, each of the lines 57 and 58 has corresponding numbers 62 along the outside rows and columns of squares 56. In the embodiment depicted herein, these numbers 62 correspond to inches, although other units of measurement may be used, such as metric units. The Omnigrid trademark 64 and other legends and indicia 66 appear inside the squares 56.

Preferably, the lines 57 and 58 have a width that is 2 one-thousandths of an inch wider than the width of the uncolored gap 38 formed by the graduations 32. In other words, if the uncolored gap 38 is 12 one-thousandths of an inch wide, the lines 57 and 58 would be 14 one-thousandths of an inch wide. In addition, the numbers 62 are preferably 2 one-thousandths of an inch larger than the corresponding uncolored numbers spaces 42 formed in the circles 40 on the first image 30 shown in FIG. 3. The intersection of the horizontal and vertical lines 57 and 58 is left blank to provide an unobstructed viewing space that enables a user to precisely align the measuring device.

Figure 10:
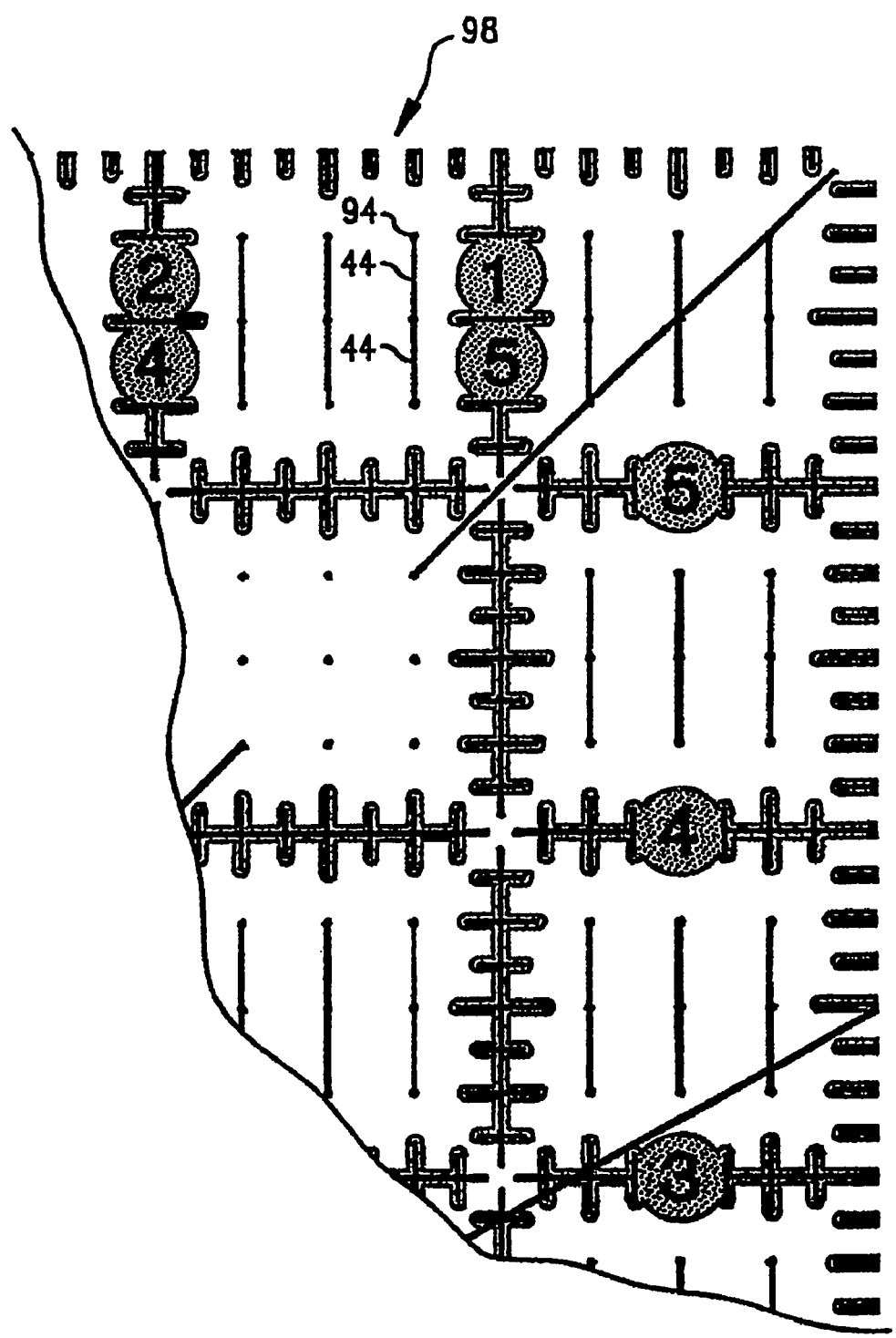
FIG. 10 is a top plan view of the composite image formed in accordance with the alternative embodiment of FIGS. 7 and 8.

When the first and second images 30 and 52 are combined, they form a composite image, as will be described more fully below in conjunction with FIG. 10. Briefly, the first image 30 is applied to the back surface 14 of the transparent sheet 11, and the second image 52 is aligned and applied on top of the first image 30. When the images 30 and 52 are so combined, the contrasting colored second image 52 fills in the gaps 38 and number spaces 42 on the first image 30, creating a composite set of lines.

The process for making the transparent measuring device of the present invention can be done by a variety of methods. Although the use of ink to create the images is described herein, other materials or processes may be used, including pigment, toner, photographic deposit, and photosensitive emulsion.

The preferred method is the screen printing process because it permits the application of a heavy deposit of ink. By way of general description, in the process of the present invention the images described above are first created and then transferred to a screen. The screen is a commercially-available material that has a thread count in the range of 150 to 400 threads per inch.

Ideally, the images 30 and 52 are created as electronic images on a computer using a commercially-available graphics program that is capable of large magnification and line generation down to and even below 1 one-thousandth of an inch. Each electronic image is then generated on to camera-ready film, such as is shown in FIGS. 3 and 4, after which it is transferred to a screen through a photo emulsion process, which is well-known in the industry.

Alternatively, present methods do permit the direct transfer of an electronic or computer image to a print screen, bypassing the step of using an ortho film, although this is much more expensive. In addition, a lithograph press, an engraving process, thermal (hot) stamping of foil, or a photographic process may also be used, as well as any combination of graphics and manufacturing. Finally, high-speed laser printers that print the computerized image directly to a plastic sheet are also available. Virtually any pigment transfer method may be used to generate the images of the present invention on the transparent sheet. Another method takes advantage of precision cutting equipment to cut out pre-printed adhesive plastic that can be applied as a layered substrate to the transparent sheet.

Continuing with the method of the present invention, once the screen is formed for the first image 30, it is mounted in accordance with conventional screen printing methods. A sheet of transparent material, preferably acrylic, such as the sheet 12 described above, is placed below the screen in a jig that holds the plastic sheet in place, as will be described in more detail below. The ink is then applied with a squeegee as is well-known in the art. It is important that the sheet of plastic be cleaned prior to the application of ink. A quick method is to use a roller on the sheet, which picks up dirt and other material off the sheet.

In the method of the present invention, the image 30 of FIG. 3 is first applied to the back surface 14 of the sheet 11. It is preferable that the first image be of a lighter color or hue, such as yellow. However, a darker or contrasting color or hue can be used for the first image, such as black or dark-shade green. When so applied to the sheet 11, the graduations 32 outline the uncolored gap 38 with uncolored subdivisions 48. In addition, the circles 40 have uncolored numbers 42 formed therein. The image 32 is then inspected and, if acceptable, set aside to dry.

After the ink from the first image has dried, the screen having the second image 52 thereon is mounted and aligned with the first image 30. Alignment is much quicker and easier, because the lines 58 and numbers 62 will cover the corresponding uncolored areas with a slight overlap. This overlap allows a small error in the alignment without resulting in misalignment of the lines 58 and numbers 62 in the corresponding uncolored gaps 38 and number spaces 42 created by the first image. The second image is then printed on the sheet using a contrasting darker color or hue. When viewed from the front surface 12 of the sheet 11, the darker lines 58 and numbers 62 will register perfectly within the gap 58 and number spaces 42 in the wider lighter line, even though the second image 52 may be slightly misaligned.

This application of the second image 52 is not an overlay of ink over the first image. Rather, it is the application of ink in the blank, un-inked areas or gaps 38 left by the first image 30, and only a slight overlap exists. As such, this method not only results in precise registration of the smaller darker line within the larger lighter line, it also reduces bleeding of one color into the other as can occur with an overlay. If the color of the first image 30 is totally opaque, then the second image 52 can have a width of two one-thousandths less than the width of the first image 30.

It has been noted that confusion as to which side of the sheet is the top side may result from having the contrasting colors visible from both sides of the sheet of transparent material. One method for overcoming this confusion is to apply an overlay of one color on the first two images, thus making only the overlay visible from the back side of the transparent sheet.

Figure 5:
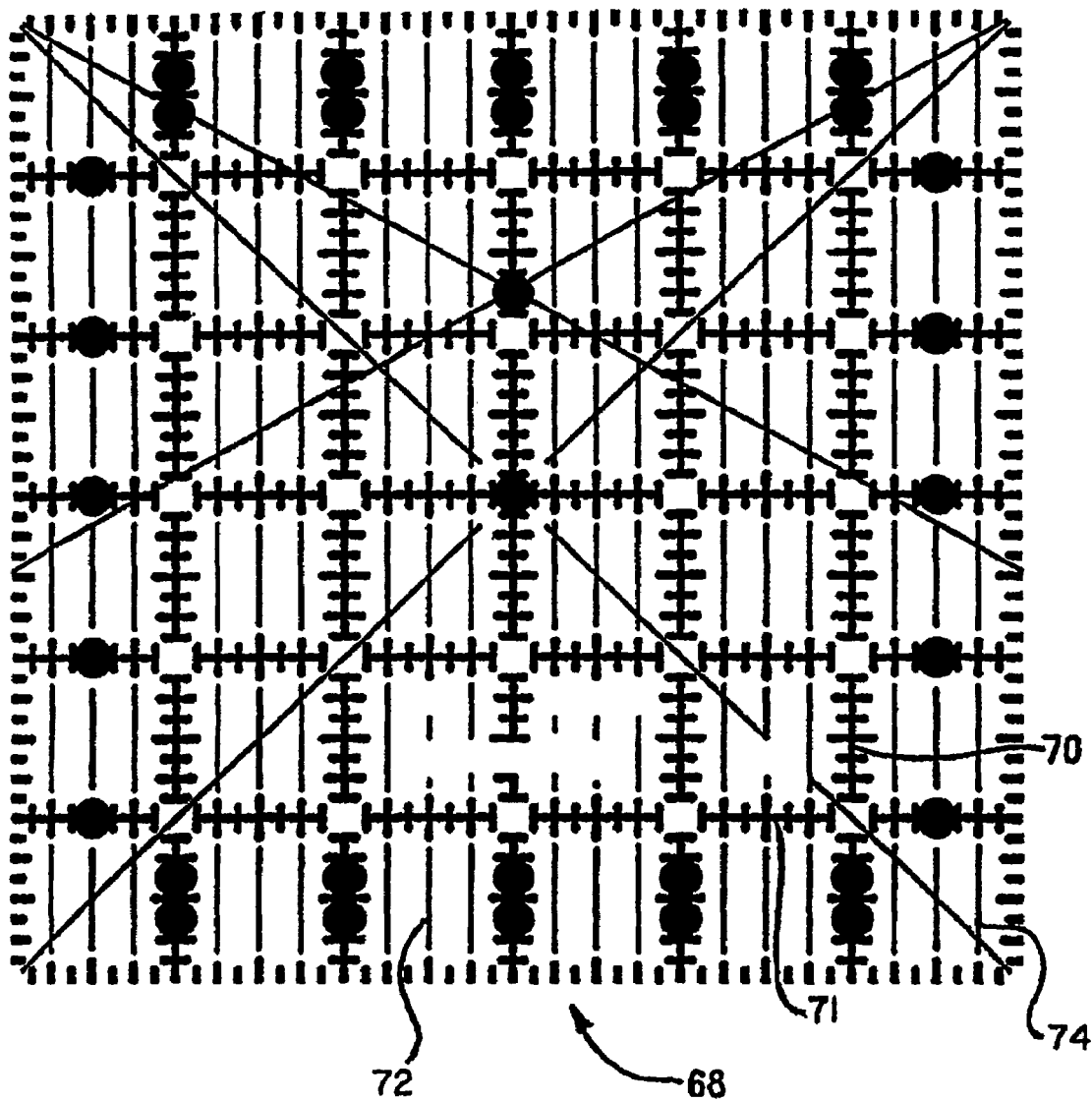
FIG. 5 is a top plan view of an optional third image to be applied to the sheet of transparent material in accordance with another embodiment of the present invention.

In this regard, FIG. 5 illustrates a third image 68 that consists of a grid pattern of thick, solid vertical lines 70 and horizontal lines 71 that are wider than the solid lines 57 and 58 of the second image 52 and slightly smaller than the graduations 32 and other lines 44 and 48, and circles 40 in the first image 32. Additional vertical lines 72 and angled lines 74 are used, which are also of a smaller width than the corresponding vertical lines 44 and angled lines 46 shown in FIG. 3.

Ideally, the lines 70 are 1 to 2 one-thousandths of an inch smaller than the corresponding lines in the first image 30. This third image 68 can be applied over the second image 52 as an overlay. This overlay encapsulates the first two images 30 and 52, improving the appearance and protecting the images, thus increasing the useful life of the tool 10. It also aids users in determining which side of the tool 10 is the front surface 12 because the overlay only permits the viewing of the composite multicolor lines from the front surface 12. The third image 68 ideally is of a color or hue that matches the first image 30, in this case a lighter color, such as yellow.

As a result of adding the overlay, another step is added to the process. Because the third image 68 is slightly smaller, minor misalignment will not be detected. Even though a third step is added in this embodiment, the overall efficiency and speed is still improved over the prior method. In addition, fewer rejections will result and a high-quality product will be produced virtually each run. However, the third image may not be necessary, such as in the lithographic process, where the second image (black in this case) is of a width to cover the entire or almost the entire first image (yellow in this case).

In the case of enhanced visibility lines where the second line is of a high-visibility pigment, the third coating can be a white or white-tinted layer, which aids in increasing the visibility of the composite lines. This layer is mixed with the anti-slip substance to form the slip-resistant lines on the working surface of the tool 10.

Figure 6:
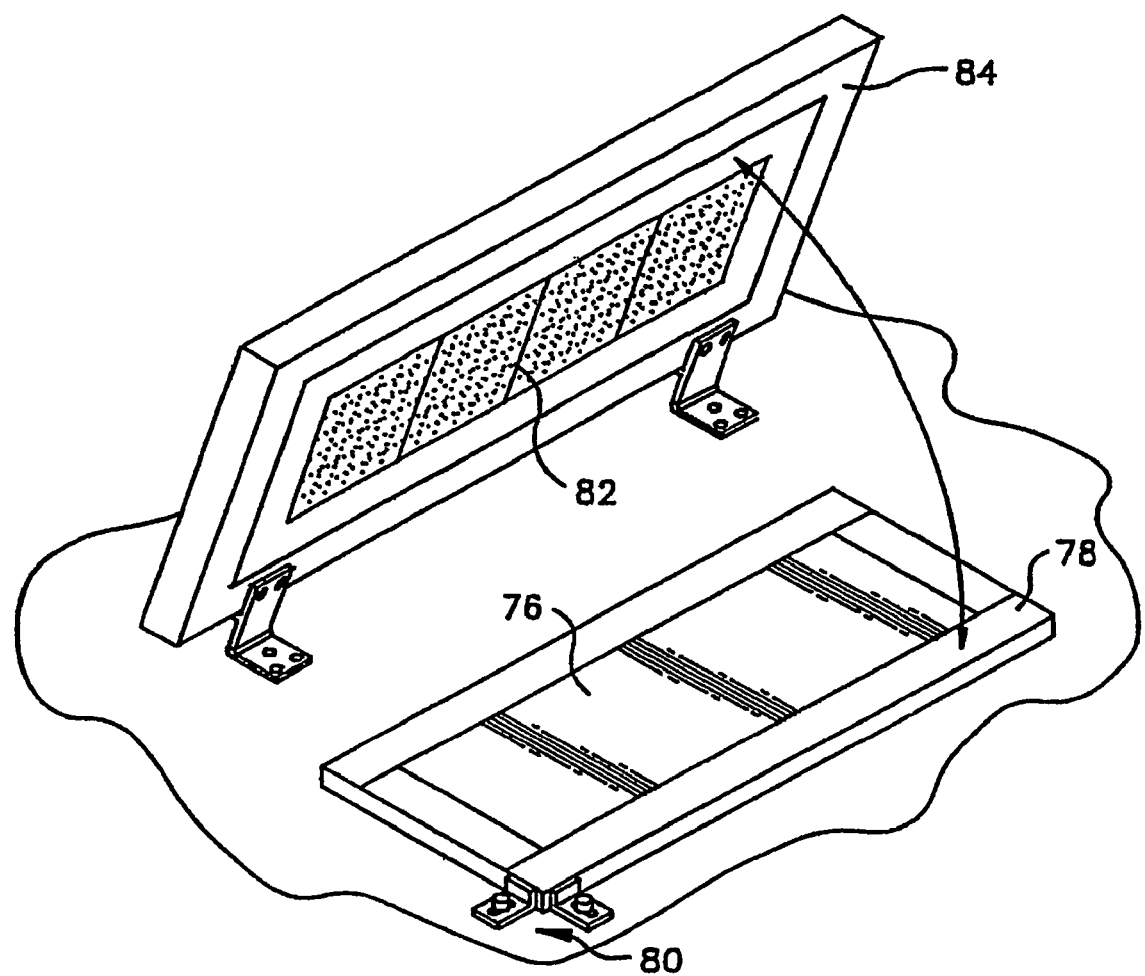
FIG. 6 is an isometric view of a screen printing apparatus for printing images in accordance with the process of the present invention.

FIG. 6 illustrates a screen printing apparatus for carrying out the method of the present invention. In particular, shown therein is a plastic sheet 76 placed in a jig 78 that holds the sheet 76 in place. The screen 82 is mounted in correlators or registration clamps 84. The jig clamps 80 may be adjusted to position the plastic sheet 76 precisely in position under the screen 82. The correlators 84 also include similar adjustment mechanisms (not shown) for making minor adjustments in the position of the screen 82.

The screen 82 is rotated into position over the plastic sheet 76 where ink is applied and a squeegee pushes the screen 82 down on the plastic sheet 76, as is well known in the art. The sheet 76 with the image printed thereon is then removed.

As will be appreciated from the foregoing, the present invention results in a higher production rate using less-skilled labor that achieves the same or better quality product. It is also to be appreciated that changes made be made without departing from the spirit and scope of the invention. For instance, the steps described above may be reversed, with the third image 68 applied to the sheet first, then the second image 52, and finally the first image 30. Alternatively, the third image can be eliminated and the first two images used. If the reverse steps are done, the images must be applied to the front side of the sheet so the second and first images will be visible. The drawback to this method is the possibility of parallax errors in viewing the lines on the top of a thick sheet of transparent material.

While a thick piece of material is preferred in order to act as a cutting guide for rotary cutters, scissors, razors, and other cutting tools, as well as a measuring and marking device, the present invention can be applied to sheets of thinner material that are then laminated together. For example, rolled sheets of 5 mil plastic can be printed by one of several methods described above, then cut and removably adhered to thin or thick transparent plastic sheets. A single color may be applied to any combination of the two sheets and then aligned prior to adhering of the sheets.

Figure 7:
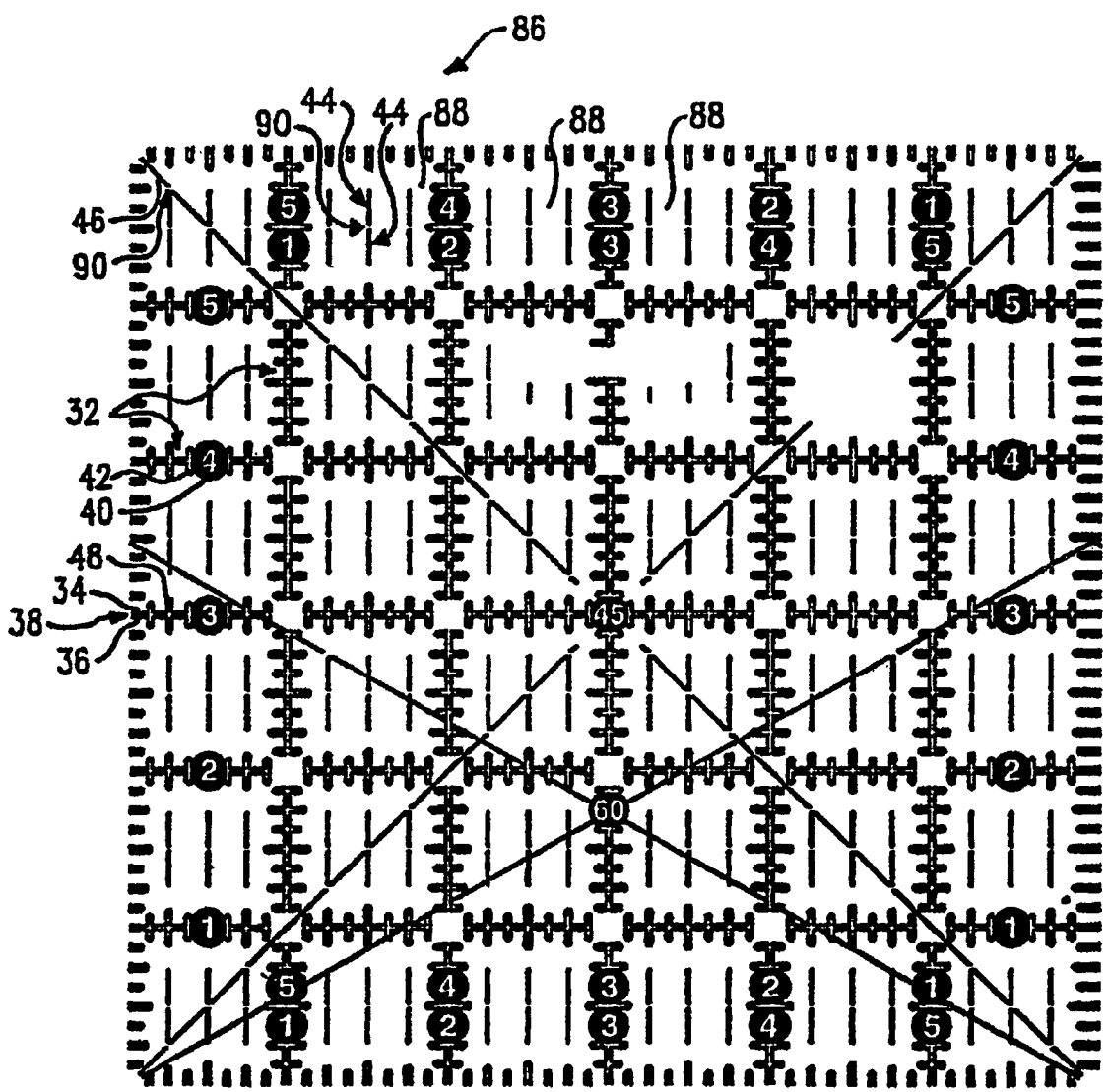
FIG. 7 is a top plan view of a first image to be applied to a sheet of transparent material in accordance with an alternative embodiment of the present invention.

FIGS. 7-10 illustrate another embodiment and further improvement in accordance with the present invention. For ease of illustration, the same reference numbers will be used for the common subject matter illustrated in FIGS. 3-5 and 7-10. Shown in FIG. 7 is a first image 86 wherein the solid vertical lines 44 in each square 88 are broken at their vertical midpoint to leave an open gap 90. Each angled line 46 is also broken at their junction with a vertical line 44 to leave the gap 90 open. In all other respects the first image 86 is identical to the first image 30 illustrated in FIG. 3. It is to be understood that the vertical lines may have more than one gap 90 formed therein. The gaps 90 may appear at regular or irregular intervals depending on the application, the scale, and the overall design.

Figure 8:
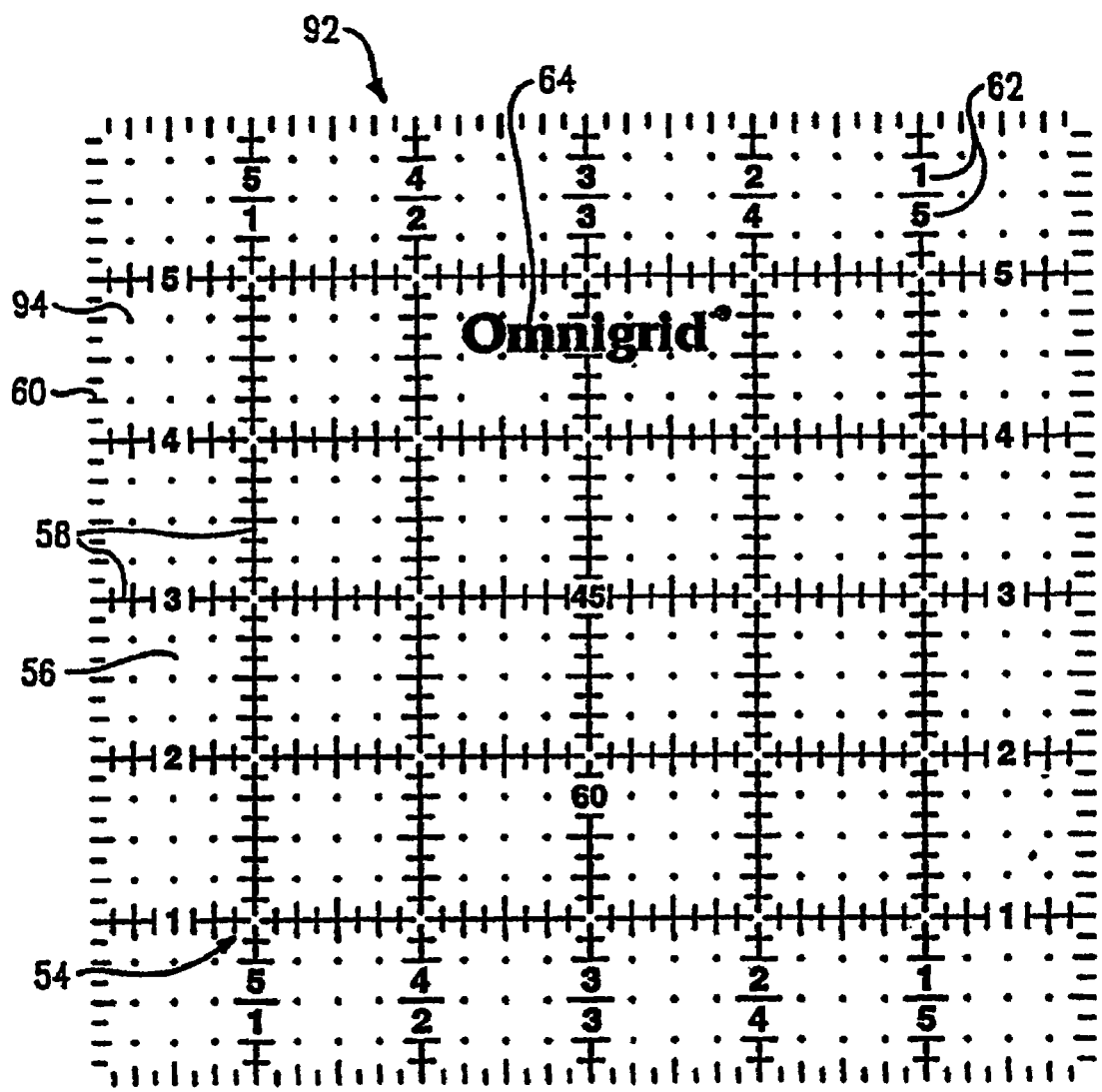
FIG. 8 is a top plan view of a second image to be applied to the sheet of transparent material in accordance with the alternative embodiment of FIG. 7.

FIG. 8 illustrates a second image 92 having squares 56 that include a plurality of dots 94. The dots 94 are positioned in each square 56 such that when the second image 92 is applied over the first image 86, the dots 94 will be located in the gaps 90 created in the vertical lines 44. Ideally, the dots 94 are of a larger size than the gaps 90 and of a contrasting color from the solid vertical lines 44 so they will be more readily visible to the user. These dots 94 will aid in aligning and measuring subdivisions on the transparent measuring device. It is to be understood that the dots 94 may be the same size or smaller than the gaps 90 if desired.

Figure 9:
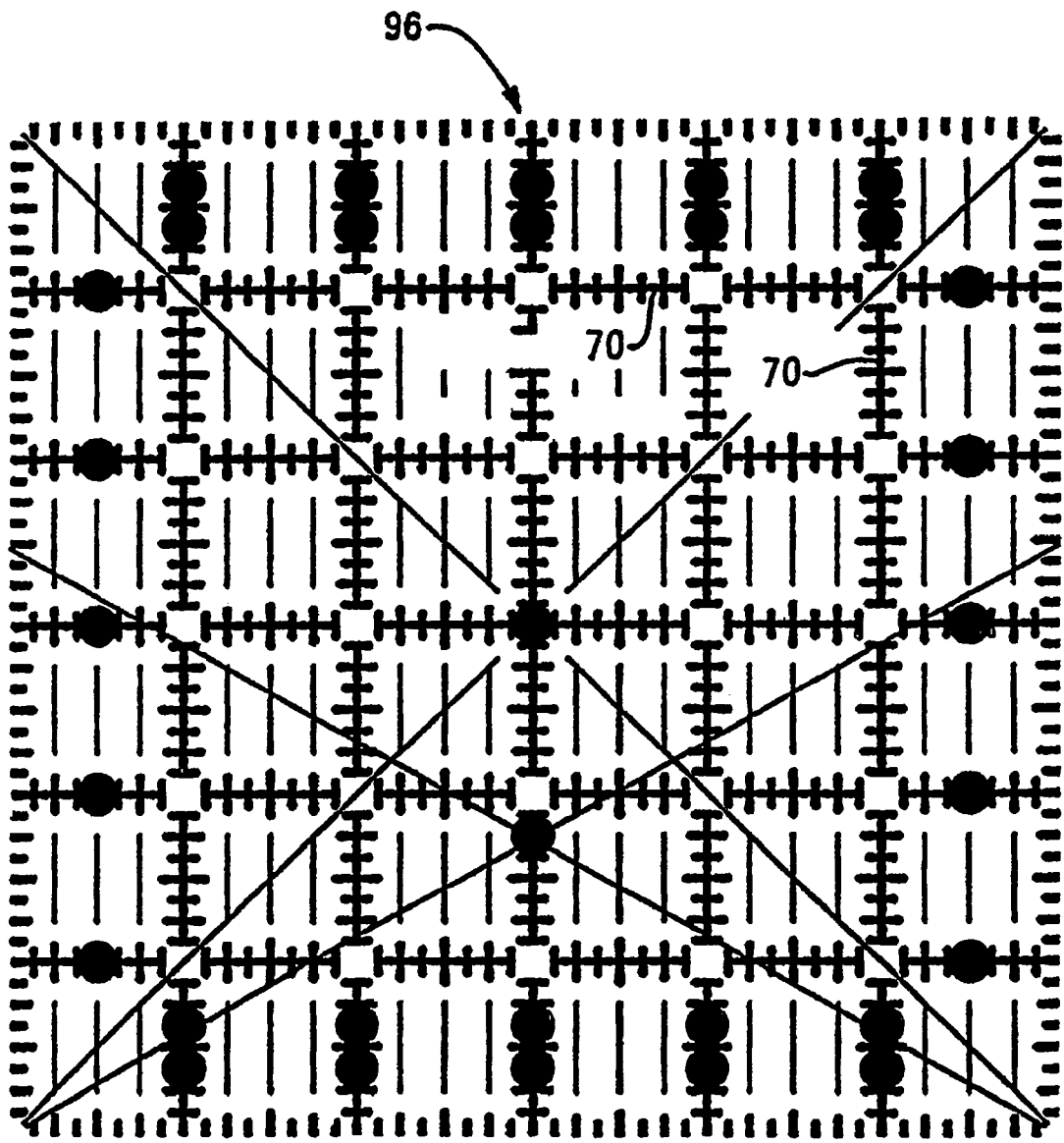
FIG. 9 is a top plan view of an optional third image to be applied to a sheet of transparent material in accordance with the alternative embodiment of FIGS. 7 and 8.

An optional third image 96 is shown in FIG. 9, which corresponds to the third image 68 illustrated in FIG. 5. The final composite image 98 consisting of the combination of the first image 86, the second image 92, and the third image 96, is shown in FIG. 10, where the dots 94 are visible between the broken solid vertical lines 44 and the angled lines 46. The process described above can be reversed if the composite image is to be applied to the opposite side of the transparent sheet.

In a further embodiment of the invention, the lines may be formed to accommodate a particular quilting or sewing pattern. For example, a quilt having a log cabin pattern of a selected size will require lines spaced a predetermined distance apart, such as three inches, to facilitate forming three-inch strips of material. In addition, a square of four and one-half inches would be formed by the lines 126, as well as an angle of 30°, and if desired, an angle of 45°. It is to be understood that the above-stated dimensions are for illustrative purposes only and may vary according to the dimensional requirements of a particular project.

From the foregoing it will be appreciated that, although specific embodiments of the invention have been described herein for purposes of illustration, various modifications may be made without deviating from the spirit and scope of the invention. Accordingly, the invention is not to be limited except as set forth in the appended claims and the equivalents thereof.

The invention claimed is:

1. A device for use in measuring material, comprising:
    a transparent substrate of rigid material having a plurality of lines formed thereon; and
    a transparent, non-removable, liquid-applied UV cured coating on a working surface of the transparent substrate of rigid material, the coating configured to resist slipping of the device on the material to be measured.

2. The tool of claim 1 wherein the lines are applied to the working surface of the substrate, and the coating is applied over selected lines of the plurality of lines.

3. The tool of claim 1 wherein the coating is mixed with pigment and applied as at least one line on the transparent substrate.

4. The device of claim 3 wherein the coating is applied as at least one line of a first color on the transparent substrate in combination with at least one other line of a contrasting color to form a composite line of contrasting colors.

5. The device of claim 4 wherein the composite line is formed of colinear composite line segments, the line segments separated by spaces having no lines formed therein.

6. The device of claim 3 wherein the pigment is configured to enhance visibility of the line in a low-light condition.

7. The device of claim 3 wherein the pigment is configured to present a neon effect when applied to the transparent substrate.

8. The device of claim 1 wherein the coating comprises material that has a high coefficient of friction and does not attract dust or lint or the material to be measured.

9. The device of claim 1 wherein the plurality of lines comprise at least one composite line formed of at least two lines of contrasting color.

10. A method making a device for use in measuring material, comprising:
    providing a substrate of rigid material;
    forming a plurality of lines on a working surface of the substrate; and
    applying a non-removable, liquid transparent coating to at least a portion of the working surface to only cover the plurality of lines on the substrate to provide a non-slip bearing surface when placed on the material to be measured.

11. The method of claim 10 wherein the coating is applied in liquid form and then dried using UV light.

12. A method of making a device for use in measuring, marking, and cutting material, the method comprising:
    providing a transparent substrate having a plurality of composite lines, each composite line formed of at least two lines of contrasting colors to enhance visibility of the composite line; and
    applying a transparent, non-removable, liquid substance on at least a portion of a surface of the transparent substrate to cover only one of the two lines of contrasting color to provide a non-slip surface, the substance having a high coefficient of friction with respect to the material to resist slipping of the substrate on the material.

13. The method of claim 12 wherein applying the substance comprises applying the substance to a working surface of the substrate in a liquid form and then drying the substance with UV light.

14. The method of claim 12 wherein applying the substance comprises mixing the substance with a pigment and applying the substance in the form of a line.

15. The method of claim 14 wherein applying the substance in the form of a line to a working surface of the transparent substrate comprises forming the line to be of one color and associating the line with another line of contrasting color to form a composite line of enhanced visibility.

16. The method of claim 14 wherein the pigment provides a neon effect to the substance.

17. The method of claim 12 wherein the substance is applied to coat an entire working surface of the transparent substrate.

18. The method of claim 12 wherein the substance is formed of material that is initially in liquid form when applied to the substrate and then dried to form a surface having a high coefficient of friction that does not attract dust or lint or the material.

19. A tool, comprising:
 a transparent substrate having a plurality of opaque lines formed on at least one surface thereof;
 a plurality of composite lines formed of a first line of a first color and a second line of a second color that contrasts with the first color to form composite lines of enhanced visibility, the composite lines formed of a pigment that enhances the visibility of the composite lines in a low-light condition; and
 a transparent, non-removable, liquid-applied substance applied only over selected lines on the transparent substrate, the substance configured to resist slipping of the tool.

20. The tool of claim 19 wherein the pigment comprises a pigment that presents a neon effect to enhance the visibility of the composite lines.

21. The tool of claim 19 wherein the plurality of opaque lines and the plurality of composite lines are applied to a working surface of the transparent substrate, and the substance is applied over the lines on the working surface of the substrate.

22. The tool of claim 21 wherein the substance is applied only over selected lines of the plurality of opaque lines and composite lines on the transparent substrate.

23. The tool of claim 21 wherein the substance is applied as a coating over the entire working surface of the substrate.

24. The tool of claim 19, comprising the substance mixed with pigment and applied as the second line over the first line on the transparent substrate.

25. The tool of claim 24 wherein the at least one line comprised of the substance mixed with pigment is applied over an existing line on the transparent substrate to protect the existing line and to provide a non-slip surface for the transparent substrate.

26. A tool for measuring and marking material and for guiding a hand-held cutting tool, comprising:
 a transparent substrate having mutually-opposing planar front and back surfaces and formed of a thickness that is adapted to guide a hand-cutting tool;
 a least one composite line formed on one of the front and back surfaces of the transparent substrate, the composite line formed of at least first and second lines of contrasting color; and
 a transparent, non-slip, non-removable, liquid-applied substance applied on the transparent substrate only over at least one of the first and second lines to provide a non-slip surface that resists slipping of the transparent substrate on the material.

27. The tool of claim 26 wherein the substance is applied to the transparent substrate in liquid form and dried using UV light, and the substance has a high coefficient of friction when dried and does not attract lint or dust or the material.

28. The tool of claim 26 wherein the substance is tinted.

29. A tool for measuring and marking material and for guiding a hand-held cutting tool, comprising:
 a transparent substrate having mutually-opposing planar front and back surfaces and formed of a thickness that is adapted to guide the hand-held rotary cutting tool; and
 a plurality of lines formed on one of the front and back surfaces of the transparent substrate, at least one of the plurality of lines formed of a non-removable, liquid-applied substance having a high coefficient of friction to resist slipping when the tool is applied to the material, the substance comprising a tackiness that is adapted to not attract dust or lint or the material.

30. The tool of claim 29 wherein the substance is applied over selected lines of the plurality of lines.

31. The tool of claim 30 wherein the plurality of lines are applied on the transparent substrate and the substance is applied on top of the plurality of lines to protect the plurality of lines and to provide a non-slip surface.

32. The tool of claim 31 wherein the substance is mixed with a pigment and applied as a line in conjunction with one of the plurality of lines to form a composite line of contrasting colors, the pigment enhancing the visibility of the composite line.

33. The tool of claim 32 wherein the pigment is configured to present a neon effect to the composite line.

* * * * *